(No Model.)

J. H. VANNOY.
COTTON STALK AND WEED CUTTER.

No. 255,217. Patented Mar. 21, 1882.

WITNESSES:
Donn Twitchell
C. Sedgwick

INVENTOR:
J. H. Vannoy
BY Munn & Co.
ATTORNEYS.

UNITED STATES PATENT OFFICE.

JAMES H. VANNOY, OF FARMINGTON, TEXAS.

COTTON-STALK AND WEED CUTTER.

SPECIFICATION forming part of Letters Patent No. 255,217, dated March 21, 1882.

Application filed November 2, 1881. (No model.)

*To all whom it may concern:*

Be it known that I, JAMES HARVEY VANNOY, of Farmington, in the county of Grayson and State of Texas, have invented a new and useful Improvement in Cotton-Stalk and Weed Cutters, of which the following is a full, clear, and exact description.

Reference is to be had to the accompanying drawings, forming a part of this specification, in which similar letters of reference indicate corresponding parts in both the figures.

Figure 1:
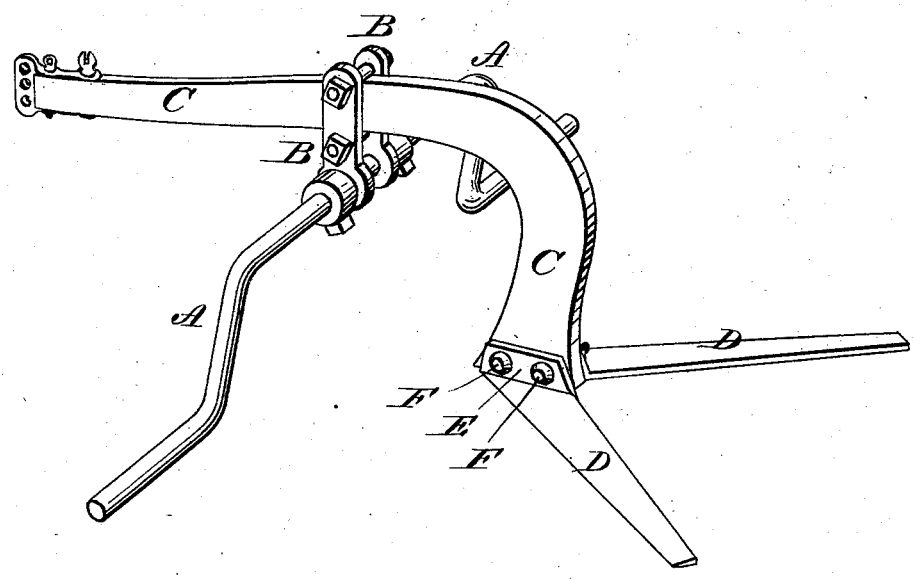
Figure 2:
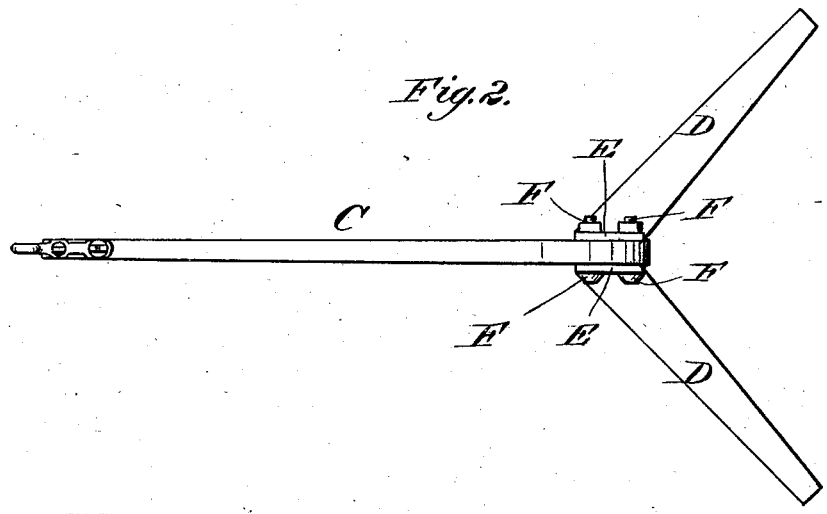

Figure 1 is a perspective view of my improvement, shown as connected with the draw-bail of a sulky-plow. Fig. 2 is a plan view of the same, shown as detached from the draw-bail.

The object of this invention is to facilitate the cutting of cotton-stalks, cornstalks, and weeds.

The invention consists of an interchangeable cotton-stalk cutter and sulky-plow consisting of the bail, the clamp, the curved plow-beam adapted to receive a plow at its rear end, and inclined cutters provided with perforated flanges and detachably secured by bolts to the opposite sides of the lower end of the said beam, as hereinafter described.

A represents the ordinary draw-bail of a sulky-plow, to which is secured by hinged clamps B an ordinary plow-beam, C.

In applying my improvement the ordinary plow is detached from the beam C, and to the lower end of the said beam, in the place where the plow is attached, are secured cutters D. The inner ends of the cutters D are bent upward to form flanges E, or have flanges E attached to them. The flanges E are so formed that the cutters D will project outward and rearward at an angle of about forty-five degrees (45°) with the line of the plow-beam C, as shown in Fig. 2. The flanges E have holes formed through them to receive the bolts F, that secure the cutters D to the said plow-beam. With this construction as the plow-beam C is drawn forward the cutters D will cut off the stalks and weeds beneath the surface of the ground. The plow-beam C and the cutters D can be raised or lowered to cut the stalks at a less or greater distance below or above the surface of the ground by the same mechanism by which an ordinary plow is raised and lowered, to work shallower or deeper in the ground.

The cutters D may be of any desired length, and both cutters or only one can be used, as the character of the work to be done may require.

I am aware that it is not broadly new to attach a cutting-blade to the lower end of a curved plow-beam, and I am also aware that cutting-blades have been detachably secured to plow-standards and to the side bars of a cultivator-frame, and I therefore do not claim such; but What I do claim, and desire to secure by Letters Patent, is—

An interchangeable cotton-stalk cutter and sulky-plow consisting of the bail A, the clamp B, the curved plow-beam C, adapted to receive a plow at its rear end, and inclined cutters D, provided with perforated flanges E, and detachably secured by bolts F to the opposite sides of the lower end of said beam, substantially as herein shown and described.

JAMES HARVEY VANNOY.

Witnesses:
A. K. HULETT,
M. C. EVANS.